Patented Feb. 7, 1933

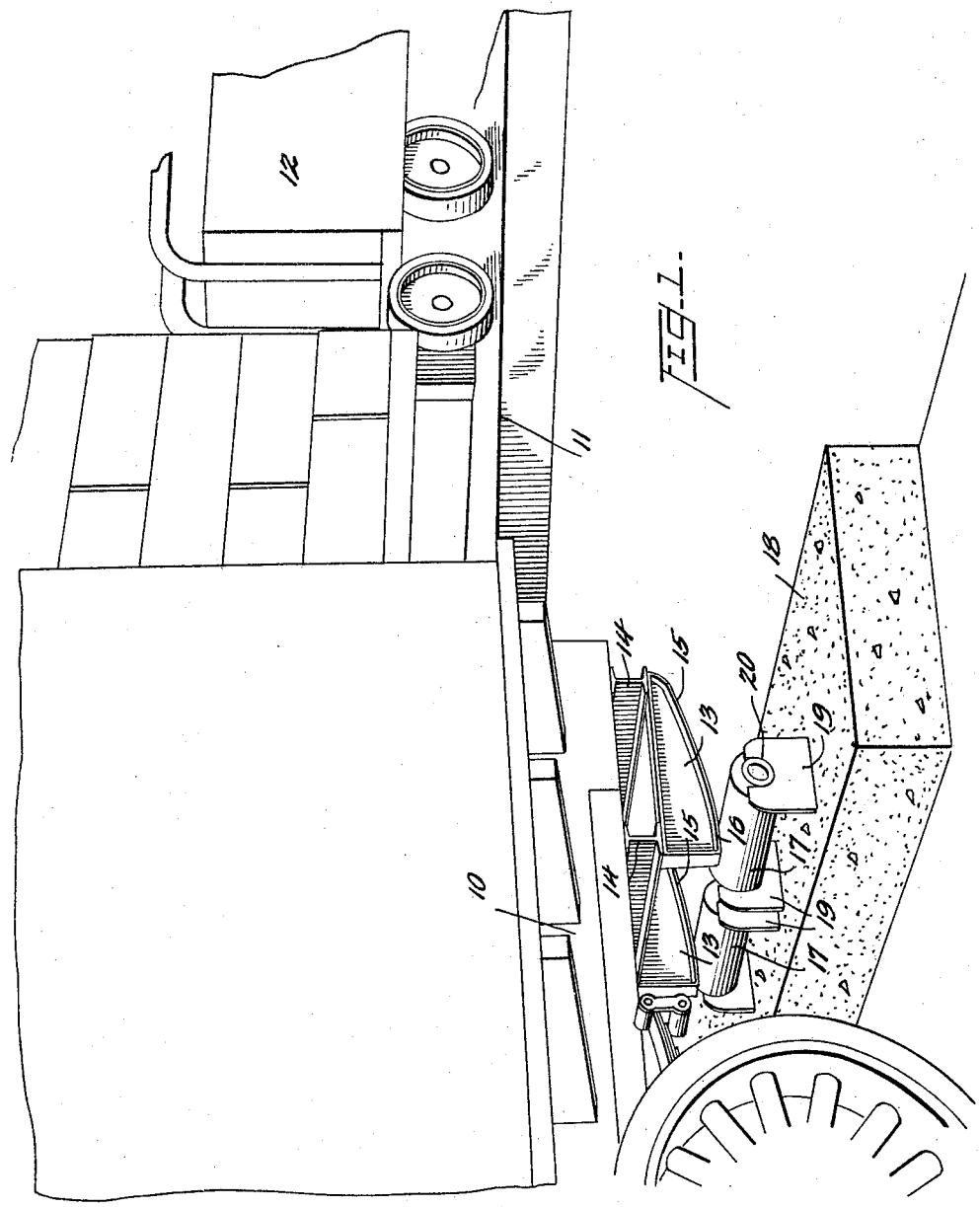

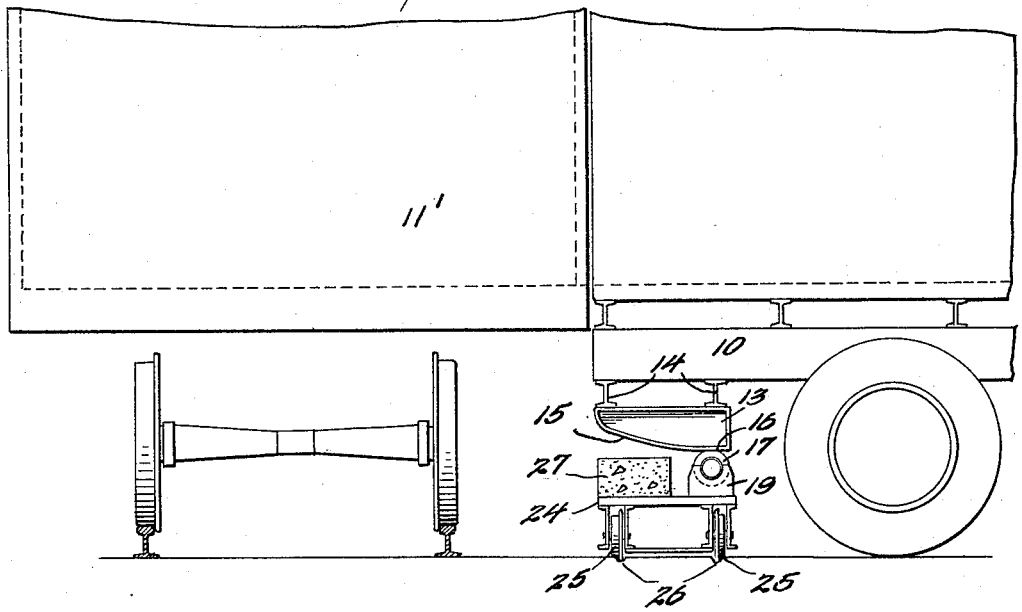
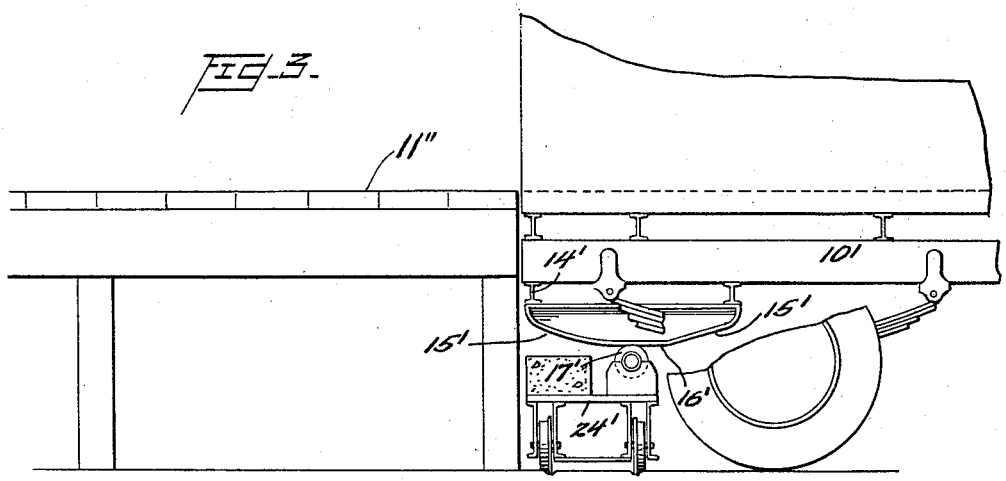
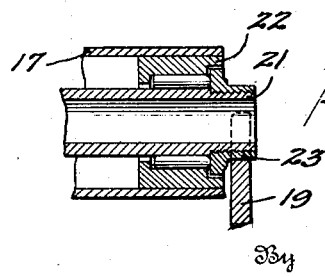

1,896,883

UNITED STATES PATENT OFFICE

ABNER F. CALLISON, OF NEW YORK, N. Y.

AUTOMATIC LEVELING DEVICE FOR VEHICLES

Application filed March 16, 1932. Serial No. 599,289.

This invention relates to leveling devices for vehicles such as motor trucks, trailers and the like, and, among other objects, aims to provide an automatic, anti-friction and inexpensive device to bring the floor of a vehicle to a level with a platform and so constructed that when the vehicle is backed to or against the platform it will support the floor in this position while the vehicle is being loaded or unloaded.

Other aims and advantages of the invention will appear in the specification when considered in connection with the accompanying drawings, wherein:—

Fig. 1 is a fragmentary perspective view showing the preferred form of mechanism applied to a motor truck and a loading platform;

Fig. 2 is a fragmentary side elevation of a slightly modified form of the leveling mechanism and showing the motor truck backed against a railway car;

Fig. 3 is a fragmentary side elevation showing a further slightly modified form of the invention wherein the vehicle is backed over portable rollers against a stationary platform; and Fig. 4 is a fragmentary sectional view of one end of an anti-friction roller.

Referring particularly to the drawings, the leveling mechanism there shown is applied to a motor truck 10, the floor of which is adapted to be raised and supported on a level with a platform 11 so that the contents of the vehicle may be unloaded or that the vehicle may be loaded. In Fig. 1, the vehicle is shown as being loaded by means of a portable lift truck 12 which may be of any suitable make. The purpose of supporting the floor of the vehicle on a level with the platform is to avoid the necessity of using bridge plates or boards between the platform and the floor and to enable hand trucks, wheeled containers, and industrial trucks such as lift trucks, for handling skids and large merchandise containers to be transferred to and from the truck body.

In the illustrated form, the chassis frame of the vehicle is supported slightly above its normal unloaded height. In other words, the leveling mechanism is adapted to support the body at or a little above its unloaded level when the tires are fully inflated, so that either an unloaded or loaded body may be leveled properly and supported flush with the platform throughout the loading and unloading operations. The height of the platform 11 above the ground or pavement is preferably standardized so that it is at or slightly above the normal height of the floors of a fleet of vehicles to be loaded or unloaded. In this instance, the chassis frame of the vehicle is raised by cam and roller action as the vehicle is backed against the platform and the power of the vehicle motor is used to effect the lift automatically.

In Fig. 1 a pair of cam members 13 in the form of flanged metal beams are secured to cross beams 14 at the rear end of the vehicle chassis frame. These cam members have rearwardly and upwardly inclined cam faces or edges 15 which merge into horizontal or level supporting faces or surfaces 16 at the forward ends, providing a stable support for the vehicle body while the load is being transferred. The inclination and curvature of the cam faces will, of course, depend upon the amount of lift required to bring the floor of the vehicle to a level with the platform. A lift of at least seven inches is generally sufficient.

There are two cam members arranged on opposite sides of the chassis frame to cooperate with anti-friction rollers 17 supported above the ground level and parallel with the edge of the loading platform 11 coacting with the cam faces 15 and the horizontal faces 16 to lift and support the vehicle body or floor in its proper position. The arrangement is such that when the truck body strikes the platform, the level part of the cam members rests on the rollers. While one such roller may be mounted on a rigid support, such as a concrete block 18 above the ground level, I prefer to employ pairs of such rollers mounted on supporting arms 19 which are conveniently embedded in or bolted to the block. This permits the rollers to have relative movement when the truck backs on a curve. The rollers are conveniently journaled in U-shaped bearing notches 20 provided in the supporting arms 19. They are well below the level of the chassis frames of all ordinary vehicles and form no obstacle in the path of any chassis.

Fig. 4 shows a detail of a suitable anti-friction roller. In this case, the rollers are shown as being made of concentric pipes, an inner section of pipe 21 projecting beyond the end of the outer section. An anti-friction bearing 22 is secured in the outer section and arranged between the sections at their ends to permit the outer section 17 to rotate with respect to the inner section 21. To retain and protect the anti-friction bearing, an annular nut 23 is preferably screwed on the inner section. It is to be understood, however, that the particular form of anti-friction rollers used is a matter of choice and their construction may be widely varied.

In Fig. 2 the motor truck is shown as being backed against a railway car 11'. In this example, the anti-friction rollers are supported on a carriage 24 having flanged wheels 25 to roll on a narrow gage track 26 parallel with the railroad track or siding. A counterweight 27 is preferably placed on one side of the carriage to prevent it from tilting as the cam members move over the rollers and lift the truck chassis. The carriage is adapted to be moved along the narrow gage track so as to be brought into the proper position adjacent to a car to be loaded or unloaded. In this case, the floor of the freight car constitutes the platform. The portable rollers obviate the necessity of spotting cars before rollers mounted on stationary supports. By employing this form of a leveling device at a railroad siding and the leveling rollers at a platform, the transfer of freight by trucks is greatly expedited.

In Fig. 3 the portable rollers are shown as being mounted adjacent to a stationary platform 11''. In this example, the shape of the cams is slightly modified, presenting inclined faces 15' at the front and rear of the horizontal portions 16' and they are made longer than the cam members shown in Figs. 1 and 2 so that they may easily be applied to cross beams 14' spaced farther apart than are the cross beams of the chassis frames shown in Figs. 1 and 2. These long cam members can easily be secured to almost any type of chassis frame at points fore and aft of the spring shackles.

From the foregoing description, it will be seen that the operation of the improved leveling device is entirely automatic and is sufficiently strong to handle heavy loads of merchandise containers and the like. The construction is very simple and can easily be applied to ordinary motor trucks. The power of the motor is utilized to effect the lifting action and the range of lifting movement is such as to allow for deflection of tires and springs under ordinary loads. It is contemplated to standardize the height of cams, rollers and roller supports; then, it is necessary only to use cross members 14 of the proper heights or widths on the frames of various makes of vehicles. While rollers may be attached to the chassis frames of the vehicles to co-act with stationary ramps of cams, it has been found to be more economical to apply the cam members to the chassis frames and to mount the rollers on fixed or portable abutments.

Obviously, the present invention is not restricted to the particular embodiment thereof herein shown and described. Moreover, it is not indispensable that all the features of the invention be used conjointly, since they may be employed advantageously in various combinations and subcombinations.

What I claim is:—

1. In combination with a load-carrying vehicle and a freight platform, a pair of cam members mounted under the rear end of the vehicle frame; and a pair of spaced, horizontal rollers supported above the ground level independently of the platform and adapted to co-operate with said cam members when the vehicle is backed toward the platform automatically to bring the floor of the vehicle to a level with the platform.

2. In combination with a load-carrying vehicle and a platform, the height of which is at least on a level with the unloaded vehicle floor, cams secured beneath the chassis frame behind the rear wheels; separate, horizontal rollers journaled on supports above the ground or pavement in front of the platform and cooperating with the cams to lift the vehicle body automatically independently of the rear wheels as the vehicle is backed against the platform to raise the floor to the platform level; and substantially horizontal surfaces on the cams providing a stable support for the vehicle body on the rollers while the load is being transferred.

3. In combination with a motor truck and a platform at or above the normal height of the floor of the truck when the truck is empty, a pair of spaced elongated rollers journaled on supports in front of and below the level of the platform; and a pair of rearwardly and upwardly inclined cam members secured to truck chassis frame behind the rear wheels coacting with said rollers automatically to lift the truck floor to a level with said platform, said cam members having substantially horizontal roller-contacting faces adjacent to their forward ends to provide stable supports for the truck body when it is backed against the platform.

4. In combination with a load-carrying vehicle used for transferring freight from and to a railway car; a pair of cam members mounted under the rear end of the vehicle; a pair of horizontal, anti-friction, cylindrical rollers coacting with the cams automatically to lift the vehicle body to the level of the car floor as the vehicle is backed into position; a weighted, wheeled carriage having journaled supports for said rollers; and a track for said carriage parallel with the railroad track so that the rollers may be moved to their proper position adjacent to any of a series of cars.

5. In combination with a motor truck and a platform from and to each of which a load is adapted to be transferred; means for automatically leveling the truck body with the platform including cam members under the rear end of the truck body; and a pair of portable rollers supported on the ground adjacent to and independent of the platform co-operating with said cam members to lift the truck body as it is backed toward said platform.

6. In combination with a motor truck and a freight car, cams mounted under the rear end of the truck body; rollers cooperating with the cam means to lift the truck body automatically as it is backed toward the freight car so that the truck floor is level with the platform of the freight car; a carriage supporting said roller means having flanged wheels; a heavy weight on the carriage to prevent it from tilting; and a track for said carriage parallel with the railroad track whereby the carriage may be moved into its proper position with respect to any of a series of freight cars.

In testimony that I claim the foregoing as my own, I have hereto affixed my signature.

ABNER F. CALLISON.